(12) United States Patent
Nagata et al.

(10) Patent No.: US 6,739,854 B1
(45) Date of Patent: May 25, 2004

(54) METHOD AND SYSTEM FOR TREATING A POWER TRANSMISSION BELT/BELT SLEEVE

(75) Inventors: Akihiro Nagata, Komaki (JP); Toshiaki Aragane, Inuyama (JP); Takashi Hamada, Kagawa (JP); Yoshiki Matsuura, Kagawa (JP)

(73) Assignee: Mitsubishi Belting Ltd. (JP)

( * ) Notice: Subject to any disclaimer, the term of this patent is extended or adjusted under 35 U.S.C. 154(b) by 661 days.

(21) Appl. No.: 09/008,675

(22) Filed: Jan. 16, 1998

(30) Foreign Application Priority Data

Jan. 16, 1997 (JP) .............................................. 9-019843
Jan. 16, 1997 (JP) .............................................. 9-019844

(51) Int. Cl.$^7$ .............................................. B29D 29/00
(52) U.S. Cl. ..................................... 425/28.1; 425/403
(58) Field of Search ............................ 425/28.1, 34.2, 425/34.3, 49, 50, 403, 403.1; 156/140, 141

(56) References Cited

U.S. PATENT DOCUMENTS

| | | | | |
|---|---|---|---|---|
| 3,031,364 A | * | 4/1962 | Perkins | .................. 156/141 |
| 4,435,351 A | * | 3/1984 | Gilmore | .................. 264/335 |
| 5,054,642 A | * | 10/1991 | Yoshida | .................. 220/276 |
| 5,073,098 A | * | 12/1991 | Mishima | .................. 425/28.1 |
| 5,192,382 A | * | 3/1993 | Hamura et al. | .............. 156/137 |

FOREIGN PATENT DOCUMENTS

KR          90-6987      * 9/1990

* cited by examiner

Primary Examiner—Robert A. Hopkins
(74) Attorney, Agent, or Firm—Wood, Phillips, Katz, Clark & Mortimer

(57) ABSTRACT

A method of treating a power transmission belt/belt sleeve of the type having an endless body with a length extending around an axis and a radially inwardly facing surface and a radially outwardly facing surface. The method includes the steps of wrapping at least one sheet of vapor-impervious film against and around the radially outwardly facing surface of the belt/belt sleeve body and vulcanizing the belt/belt sleeve with the at least one sheet of vapor-impervious film wrapped around the belt/belt sleeve body.

8 Claims, 4 Drawing Sheets

METHOD AND SYSTEM FOR TREATING A POWER TRANSMISSION BELT/BELT SLEEVE

BACKGROUND OF THE INVENTION

1. Field of the Invention

This invention relates to power transmission belts and, more particularly, to a method of treating a power transmission belt/belt sleeve to produce a vulcanized power transmission belt. The invention is also directed to a treating system in which the inventive method can be performed.

2. Background Art

In an exemplary belt forming process, an unvulcanized belt sleeve is formed with laminated compression rubber, tension rubber and adhesive rubber layers, with load carrying cords being embedded in the adhesive rubber layer between the compression and tension rubber layers. Typically, these components are formed around a mold. An elastically deformable cylindrical jacket is concentrically located around the belt sleeve. The mold with the belt sleeve and jacket thereon is then placed on a supporting stand in a vulcanizing vessel. An elastic packing material is disposed between the belt sleeve and the mold. The supporting stand is directed through an open upper portion of the vulcanizing vessel and is supported at the bottom of a chamber defined by the vessel. The open upper end of the vessel is then sealed with a cover. The belt sleeve is then vulcanized by applying high pressure vapor against the jacket, with low pressure vapor being directed into the mold.

After vulcanization, the jacket is removed and a grinding wheel, with a plurality of V-shaped ribs and a cutting surface thereon, is used to grind the belt sleeve to form a plurality of V-shaped ribs on a surface thereof. An exemplary grinding system is shown in Japanese Patent Publication No. 7-37084.

In this conventional method, the high pressure vapor applied to the jacket forces the jacket against the radially outwardly facing surface of the belt sleeve to thereby expel air from the space between the jacket and the mold. The unvulcanized belt sleeve is thereby vulcanized and solidified to maintain a predetermined shape. Ideally, the vulcanized belt sleeve assumes a rigid, predetermined shape without there being any captured air bubbles in the belt sleeve.

This type of jacket is conventionally pre-formed by wrapping an unvulcanized rubber layer, with a predetermined thickness, around a mold to define a jacket body. A radially outwardly extending flange is then formed at one axial end of the jacket body. A separate cylindrical jacket is fitted over the jacket body and abuts to the flange. This subassembly is then placed in a vulcanizing vessel and the primary jacket is vulcanized and thereafter released from the mold.

While the conventional method of vulcanizing using custom formed jackets, as described above, has been effective, there are a number of problems associated with this process. First of all, the jackets are custom designed for a specific belt sleeve configuration. Thus, in belt manufacturing operations where multiple belt sleeve configurations are formed, an equal number of jackets must be kept on hand and readily accessible for use. In some manufacturing facilities, these multiple jackets may take up a significant amount of valuable space.

Additionally, in some operations, jackets of a particular size may be used infrequently. Each time such little used jackets are needed, visual inspection of the jackets may be required.

In high volume belt production facilities, efficiency is important. In the same facilities, belt sleeves of different size may be produced somewhat randomly. To efficiently operate, it is important that an appropriately sized jackets be readily accessible to be picked up and placed on the belt sleeve at the pre-vulcanization station. However, generally, no matter how the stored jackets are organized, inevitably the selection and attachment of the jackets takes a considerable amount of time, which may limit production on a particular line, which may in turn result in lost time in changing lines.

In order to produce high quality belts, it is important to prevent vapor leakage through the jackets as a result of which penetration of the vapor into the unvulcanized belt sleeves may occur. Special steps must be taken to avoid this situation. Jackets that have been used for a long period of time must be carefully and regularly checked to determine that the supporting flanges and surfaces contacting the belt sleeve have not deteriorated. The flange region must also be inspected to make certain that no dust or foreign material has adhered to or accumulated at the flanges. Further, the jacket length and circumference may change over time, and it is thus important that these dimensions be regularly checked. A poor quality jacket may result in bubble formation within the unvulcanized belt sleeve, which detracts from the integrity and appearance of the belts that are formed from the sleeve.

As new jackets are being substituted for used and deteriorated jackets, the new jackets must be pre-heated in the vulcanizing vessel prior to being used on an unvulcanized belt sleeve so that the jackets are expanded to the desired length and circumference for the associated belt sleeves with which they are used. Thus, the break in for new jackets introduces another potential time loss on production lines.

SUMMARY OF THE INVENTION

The invention contemplates a method of treating a power transmission belt/belt sleeve of the type having an endless body with a length extending around an axis and a radially inwardly facing surface and a radially outwardly facing surface. The method includes the steps of wrapping at least one sheet of vapor-impervious film against and around the radially outwardly facing surface of the belt/belt sleeve body and vulcanizing the belt/belt sleeve with the at least one sheet of vapor-impervious film wrapped around the belt/belt sleeve body.

In one form, the belt/belt sleeve body has axially spaced, axially facing ends and the sheet of vapor-impervious film is wrapped over at least part of each of the axially spaced, axially facing ends of the belt/belt sleeve body.

The method may further include the step of mounting the belt/belt sleeve on a mold, with the vulcanization taking place with the belt/belt sleeve mounted on the mold.

After vulcanizing the belt/belt sleeve, the at least one sheet of vapor-impervious film may be removed from the belt/belt sleeve body.

The radially outwardly facing surface of the belt/belt sleeve body may be treated after removing the at least one sheet of vapor-impervious film.

The treating of the belt/belt sleeve may involve grinding the radially outwardly facing surface of the belt/belt sleeve body.

The grinding may involve forming at least two groves in the belt/belt sleeve body through the radially outwardly facing surface to define at least one V-shaped rib extending along the length of the belt/belt sleeve body.

Alternating grooves and teeth may be formed along the length of the belt/belt sleeve body.

The grooves and teeth may be formed at the radially inwardly facing surface of the belt/belt sleeve. With the grooves and teeth so formed, the at least one sheet of vapor-impervious film may be removed after vulcanizing after which the radially outwardly facing surface of the belt/belt sleeve is ground.

The at least one sheet of vapor-impervious film may be spirally wrapped or wrapped in a single turnaround the belt/belt sleeve body.

In one form, the belt/belt sleeve body has axially spaced, axially facing ends which join to the radially outwardly facing surface of the belt/belt sleeve body at first and second corners. A sealing material, in addition to the vapor-impervious film, may be applied at at least one of the first and second corners prior to vulcanizing the belt/belt sleeve.

The sealing material may be at least one of rubber-impregnated canvas or non-woven fabric.

The invention also contemplates a treating system including a belt/belt sleeve having an endless body with a length extending around an axis and a radially inwardly facing surface and a radially outwardly facing surface, at least one sheet of vapor-impervious film against and extending around the radially outwardly facing surface of the belt/belt sleeve body, and a vulcanizing vessel in which the belt/belt sleeve, with the at least one sheet of vapor-impervious film thereon, resides and in which a vulcanization process can be carried out.

In one form, the belt/belt sleeve body has axially spaced, axially facing ends and the at least one sheet of vapor-impervious film extends at least partially over the axially spaced, axially facing ends of the belt/belt sleeve body.

The belt/belt sleeve body may be mounted on a mold.

The vapor-impervious film may be a synthetic resin.

In one form, the belt/belt sleeve body has axially spaced, axially facing ends which join to the radially outwardly facing surface of the belt/belt sleeve body at first and second corners and the treating system further has a sealing material which is applied over the vapor-impervious film at at least one of the first and second corners.

The sealing material may bridge between the belt/belt sleeve and a mold on which the belt/belt sleeve is mounted at the at least one corner.

The sealing material may be at least one of rubber-impregnated canvas and a non-woven fabric.

The at least one sheet of vapor-impervious film may be spirally wrapped or wrapped in one turn around the outwardly facing surface of the belt/belt sleeve body.

The radially inwardly facing surface of the belt/belt sleeve body may have alternating grooves and teeth along the length of the belt/belt sleeve body.

DETAILED DESCRIPTION OF THE DRAWINGS

Figure 1:
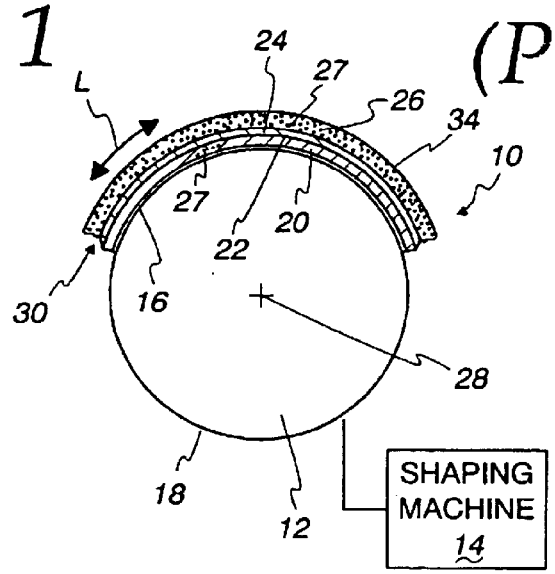
FIG. 1 is a fragmentary, plan view of a mold with a conventional, unvulcanized belt/belt sleeve mounted thereon.
Figure 2:
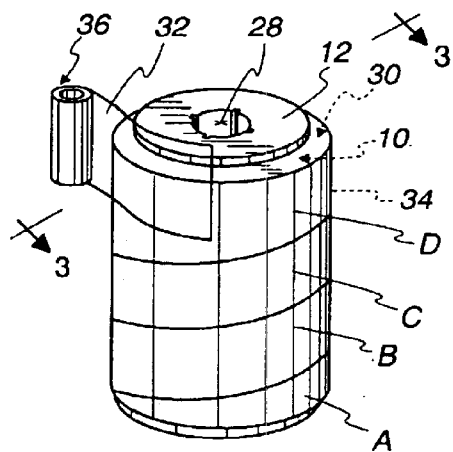
FIG. 2 is a reduced, perspective view of the mold and belt/belt sleeve in FIG. 1 with sheets of vapor-impervious film, according to the present invention, wrapped there-around.

In FIGS. 1 and 2, one exemplary construction of a belt/belt sleeve, which can be treated according to the present invention, is shown at 10. It should also be understood that while the formation of a belt sleeve is most commonly carried out, as described below, and that individual belts are then cut from the belt sleeve, individual belts could be formed and treated according to the present invention in the same manner. Thus, the inclusive terminology "belt/belt sleeve" is used throughout the description herein and in the claims.

The belt/belt sleeve 10 consists of layers which are sequentially wrapped upon a mold/drum 12. It should be understood that the particular arrangement of components is but exemplary of the many types of belt constructions that can be treated according to the invention. Initially, the mold/drum 12 is placed upon a shaping machine 14. One layer, or a plurality of layers, of reinforcing fabric 16 are applied over the outer surface 18 of the mold/drum 12. An unvulcanized rubber layer 20, which defines the tension section of the completed belt, is applied over the reinforcing fabric 16. Another unvulcanized rubber layer 22 is applied over the rubber layer 20 to function as a cushion rubber layer on the completed belt. Load carrying cords 24 are wrapped spirally around the rubber layer 22. The load carrying cords 24 may each be made from, for example, polyester fiber, aramid fiber, glass fiber, or the like. An outer rubber layer 26 is wrapped over the load carrying cords 24 and rubber layer 22 to define the compression section of the completed belt. In this operation, the belt components are assembled in an inside out relationship. This operation is generally referred to as an inverse-shaping process.

The unvulcanized rubber layers 20, 26 are made from rubber material, such as natural rubber, butyl rubber, styrene-butadiene rubber, chloroprene rubber, ethylene-propylene rubber, alkylated chlorosulfonated polyethylene, hydrogenated nitrile rubber, and a mixed polymer of hydrogenated nitrile rubber and a metal salt of an unsaturated carboxylic acid, or a mixture of these rubber materials.

Short fibers 27 may be embedded in the layers 20, 26 so that their lengths are aligned generally with the central axis 28 of the mold/drum 12 i.e. generally orthogonally to the length L of the endless body 30 defined by the aforementioned components 16, 20, 22, 24, 26. The short fibers 27 may be, for example, para-aramid fiber (such as those sold commercially under the trademarks TWARON™, KEVLAR™, and TECHNORA™), nylon, polyester, vinylon, or cotton. The fibers 27 are commonly added in an amount from 5 to 40 parts by weight per 100 parts by weight of rubber in each of the layers 20, 26. The rubber layer 22 defining the cushion rubber layer may contain such reinforcing short fibers 27. However, preferably, this layer 22 does not contain such fibers 27.

The reinforcing fabric 16 may be made from cotton, polyester fiber, nylon, or the like, and may be plain woven, twill woven, satin woven, or the like. A canvas in which the weft and warp yarns therein intersect at a wide angle of from 90 to 120° may be used. The fabric 16 may be processed with an RFL solution, after which it may be coated with a rubber composition through friction coating to form a rubber-impregnated canvas layer. The RFL solution is a mixture of resorcinol-formalin pre-condensate with latex, in which the latex may be one of chloroprene, styrene-butadiene-vinylpyridine terpolymer, hydrogenated nitrile, nitrile-butadiene rubber (NBR), etc.

Figure 3:
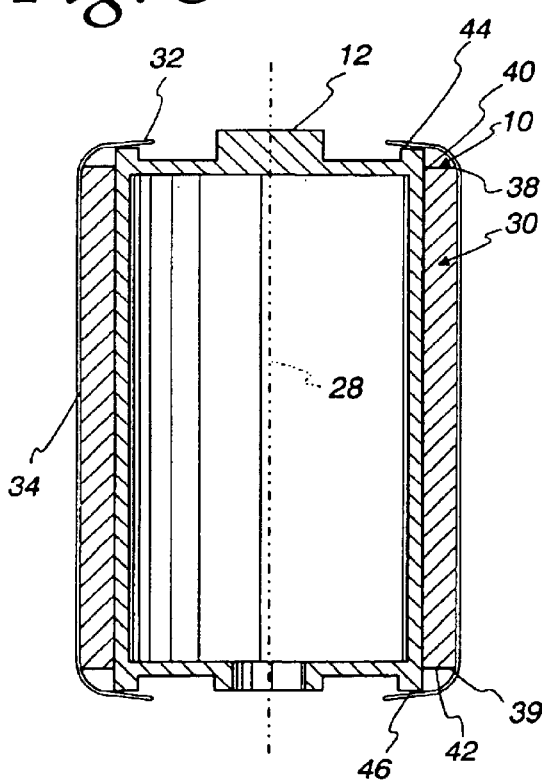
FIG. 3 is a cross-sectional view of the mold and belt/belt sleeve taken along line 3—3 of FIG. 2.

In FIGS. 2 and 3, sheets of vapor-impervious film 32 are wrapped against and around the radially outwardly facing surface 34 of the belt/belt sleeve body 30 with the belt/belt sleeve mounted to the mold/drum 12. In this embodiment, the film 32 is dispensed from a roll 36 of the film 32 and spirally wrapped around the belt/belt sleeve 10 to fully cover the radially outwardly facing surface 34 thereof. The wrapping of the film 32 can be conveniently carried but with the mold/drum 12 separated from the shaping machine 14 upon which the belt/belt sleeve 10 was formed.

In a preferred form, the film 32 extends axially up to and beyond each of the corners 38, 39 between the radially outwardly facing surface 34 of the belt/belt sleeve body 30 and the axially spaced, axially facing ends 40, 42 of the belt/belt sleeve 10. More preferably, the film 32 extends beyond the corners 38, 39 to over each of the axial ends 44, 46 of the mold/drum 12, thereby bridging between the belt/belt sleeve 10 and mold/drum 12 to effect a complete seal therebetween so that no part of the belt/belt sleeve 10 is directly exposed to high pressure vapor during vulcanization. Further, the turns A, B, C, D (FIG. 2) of the film 32 preferably axially overlap to make a complete seal. Preferably, the film 32 is wrapped so that there are 2 to 4 layers over the radially outwardly facing surface 34.

The invention also contemplates that a single turn of the film 32 could be used. Most preferably, with this construction, the film 32 has a width greater than the axial dimension of the radially outwardly facing surface 34 of the belt/belt sleeve 10 so that the film 32 can lap over the ends 40, 42 of the belt/belt sleeve 10 and at least partially over the ends 44, 46 of the mold/drum 12.

The film 32 is preferably a synthetic resin film of, for example, polyamides (such as nylon 6, nylon 6,6, nylon 6,10,), aramids, or polyesters, such as polymethylpentene, polyvinylidene chloride, polyvinyl chloride, polyethylene, polypropylene, and the like. Of these, synthetic resin films of polymethylpentene or polyvinylidene chloride, such as that which forms conventional Saran Wrap®, are preferred, since they can be easily wrapped against and around the belt/belt sleeve 10 without peeling off during vulcanization. Further, this material shrinks little when it is heated and also can be used safely without generating any toxic gas during vulcanization.

The thickness of the film 32 is not precisely limited, but is preferably sufficiently thin that it can be easily wrapped to, and conformed around, the belt/belt sleeve 10 and mold/drum 12.

Figure 5:
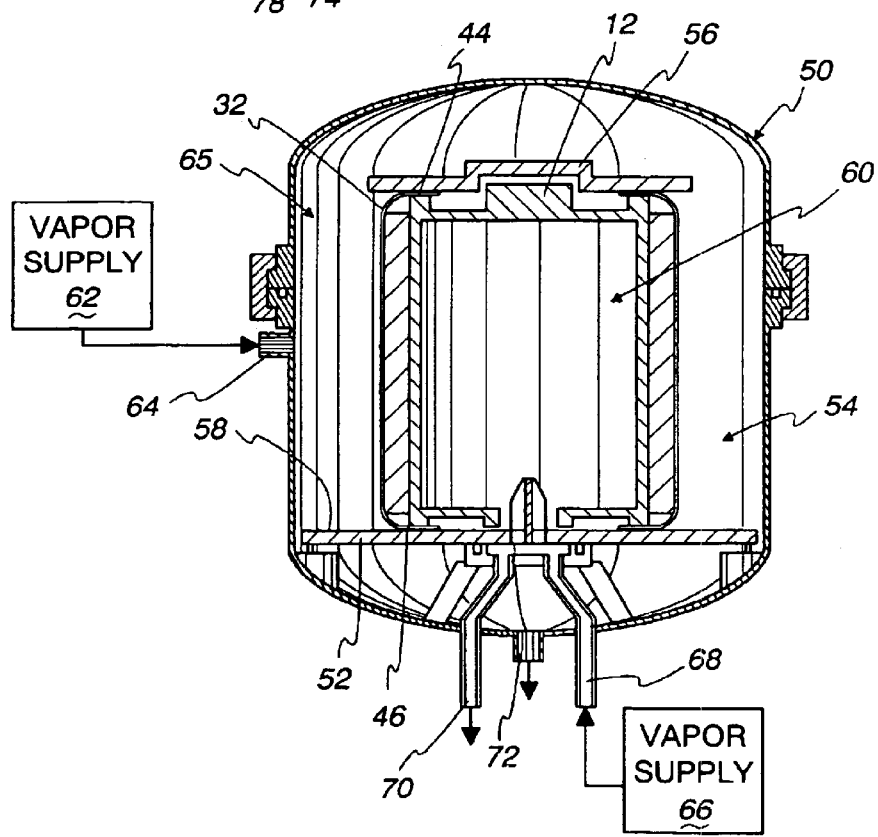
FIG. 5 is a reduced, cross-sectional view of a vulcanizing vessel with the mold and belt/belt sleeve in FIG. 3 operatively located therein for the performance of a vulcanizing procedure.

After the film 32 is applied as in FIG. 3, the mold/drum 12, with the film encased belt/belt sleeve 10 mounted thereon, can be placed in a conventional vulcanizing vessel 50, shown in FIG. 5. A support stand 52 for the mold/drum 12 with the belt/belt sleeve 10 mounted thereon, is provided within a treatment space 54 within the vessel 50. With the mold/drum 12 and belt/belt sleeve 10 operatively mounted within the vessel 50 as in FIG. 5, a cover 56 is placed atop the mold/drum 12, captively pressing the film 32 against the mold end 44. The film 32 is likewise captive between the lower mold end 46 and an upwardly facing surface 58 on the support stand 52.

Vulcanization is then carried out in a conventional manner, i.e. with high pressure vapor introduced into the space 54 externally of the belt/belt sleeve 10 with low pressure vapor introduced within the region 60 within the mold/drum 12. The vapor is introduced from a high pressure supply 62 through an inlet 64 to the region 65 of the space 54 outside of the belt/belt sleeve 10. Low pressure vapor is introduced from a separate supply 66 through an inlet 68 in the vessel 50 to the region 60. Condensed, low pressure vapor discharges through a vessel outlet 70 to an appropriate location while condensed high pressure vapor discharges through an outlet 72 to an appropriate location.

A rubber packing (not shown) may be provided between the bottom end 46 of the mold and the surface 58 on the support stand 52 to prevent low pressure vapor from leaking out towards the belt/belt sleeve 10.

It is also possible to provide an exhaust conduit (not shown) extending to externally of the vessel 50 to expel air from the vulcanizing vessel 50 during the vulcanization process that may reside between the mold/drum 12 and the film 32 and air that may reside between the cover 56 and the mold/drum 12.

The exact conditions for vulcanization are not critical, as those skilled in the art are familiar with all critical parameters. It is preferred that the temperature be controlled so that the film 32 does not melt at the controlled vulcanization temperatures. Generally, it is preferred that vulcanization take place at temperatures between 140° C. and 160° C.

Figure 4:
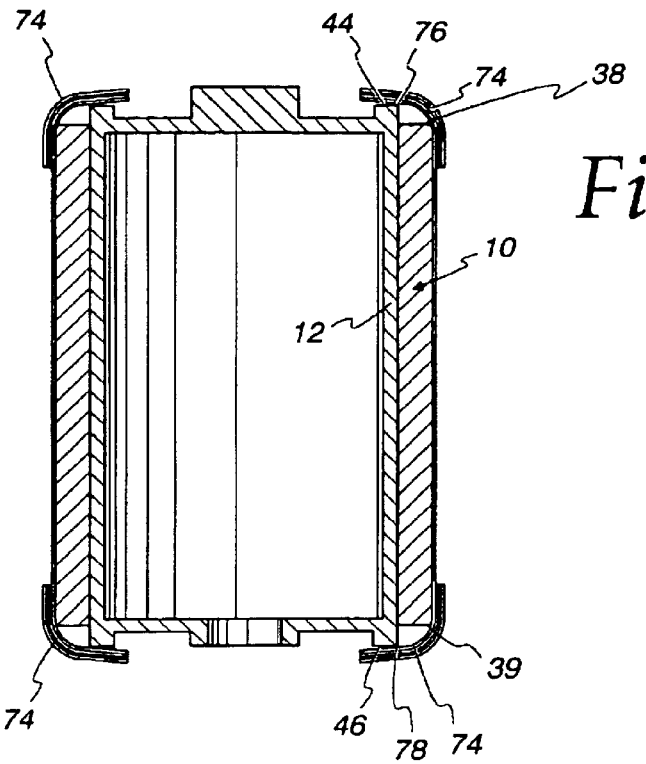
FIG. 4 is a view as in FIG. 3 with additional layers of sealing material applied at the axial ends of the mold and belt/belt sleeve.

In FIG. 4, a modified sealing arrangement is shown. Sealing material, in the form of sheets 74, is placed over the corners 38, 39, of the belt/belt sleeve and at least partially overlies the mold/drum ends 44, 46, extending at least to the corners 76, 78 between the mold/drum ends 44, 46 and the outer mold surface 18. The sealing material 74 provides a more positive air tight seal at the upper and lower ends of the mold/drum 12. The sealing material 74 may be rubber-impregnated canvas of spun yarn made from, for example, polyamide fiber (i.e. nylon 6, nylon 6,6, nylon 6,10, nylon 4,6, nylon 12) or polyester fiber, or filament yarns of polyvinyl alcohol, polyethylene, polypropylene, and the like, or cotton. Preferably, a single layer sheet is used. Two-ply or four-ply laminates may be used. Non-woven fabric may also be used as the sealing material 74. Multiple sheets of sealing material 74 are contemplated.

After the vulcanization process is completed, the mold/drum 12 is removed from the vessel 50, whereupon the film 32 can be peeled from the belt/belt sleeve 10. The used film 32, which is relatively inexpensive, can be compacted and easily disposed of. The belt/belt sleeve 10 can be separated from the mold/drum 12 before or after removing the film 32.

While the radially outwardly facing surface 34 of the belt/belt sleeve 10 may be relatively rough, as compared with that of a belt/belt sleeve made using a conventional jacket, the belt/belt sleeve 10 can be made according to the invention without any significant number of pores or encapsulated bubbles resulting from the vulcanization process.

Figure 6:
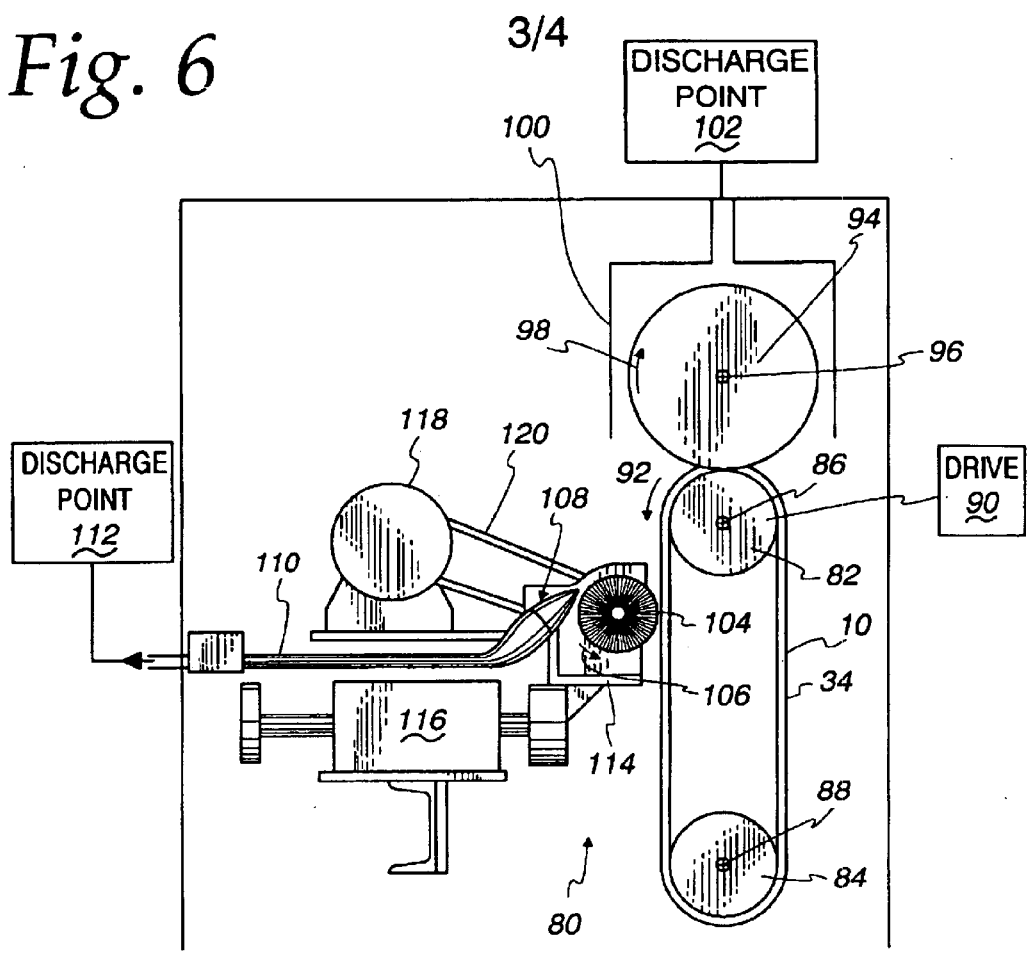
FIG. 6 is a side elevation view of a grinding system for treating the vulcanized belt/belt sleeve after the vapor-impervious film is removed therefrom.

The belt/belt sleeve 10 can then be further treated using a grinding system as shown at 80 in FIG. 6. The grinding system 80 has rollers 82, 84, rotatable about parallel axes 86, 88, respectively. A drive 90 rotates the roller 82 in the direction of the arrow 92. The belt/belt sleeve 10 is trained in an endless path around the rollers 82, 84 so that the radially outwardly facing surface 34 on the belt/belt sleeve 10 is exposed. The spacing between the rollers 82, 84 can be varied to place the belt/belt sleeve 10 under a predetermined tension. The speed at which the drive 90 is operated to advance the belt/belt sleeve 10 is selectable by one skilled in the art.

The radially outwardly facing surface 34 of the belt/belt sleeve 10 is treated with a grinding wheel 94 that is rotatable around an axis 96 in the direction of the arrow 98. The grinding wheel 94 operates on the moving belt/belt sleeve 10 to simultaneously form a plurality, and preferably 3 to 100, grooves through the radially outwardly facing 34 of the belt/belt sleeve 10. The grinding wheel 94 and belt/belt sleeve 10 may be rotated oppositely, as shown in FIG. 6, or in the same direction. In a preferred form, the grinding wheel 94 rotates at between 400 and 2,000 rpm.

The grinding produces rubber particles and powder, some of which is flunnelled into a shroud 100 by vacuum force, while some additional particles and powder adheres to the belt/belt sleeve 10. That which is drawn into the shroud 100 can be directed to an appropriate discharge point 102.

The particles adhering to the belt/belt sleeve 10 can be separated from the belt/belt sleeve 10 through a rotary brush 104 rotating in the direction of the arrow 106. As the brush 104 operates, the particles are drawn by a vacuum device 108, having an inlet disposed adjacent to the brush 104, through a conduit 110 to a discharge point 112. The brush 104 is mounted on a supporting stand 114 which, through a cylinder 116, is movable towards and away from the belt/belt sleeve 10. The brush 104 is driven by a motor 118 through an endless belt 120. The brush 104 may be rotated between 100 and 800 rpm, with the brush 104 exerting a pressure on the belt/belt sleeve of between 2 and 6 kg/cm (linear pressure). The brush 104 is urged against the belt/belt sleeve 10 with a predetermined pressure preferably at all times that the belt/belt sleeve 10 is being ground. The brush 104 has filaments of synthetic fiber, such as nylon or polyester, or metal wires of brass, or the like, projecting radially from its rotational axis.

Figure 7:
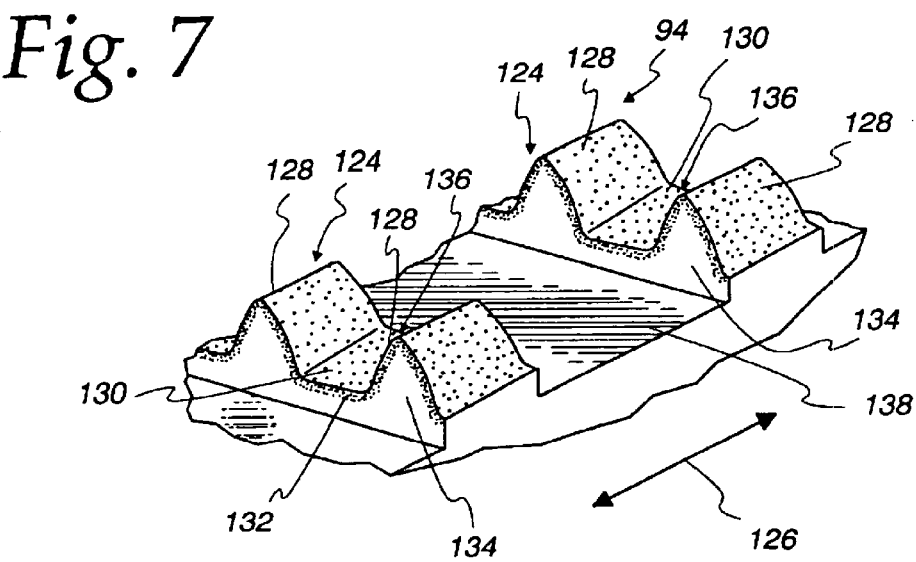
FIG. 7 is an enlarged, fragmentary, perspective view of a grinding wheel in the grinding system in FIG. 6 to form ribs in the belt/belt sleeve.

While not so limited, a suitable construction for the grinding wheel 94 is shown in FIG. 7. The grinding wheel 94 has grinding projections 124 spaced from each other in the circumferential direction of the grinding wheel 94 i.e. in the direction of the arrow 126. The projections 124 are spaced from each other at a regular pitch distance. Each projection 124 has a plurality of triangular ribs 128 spaced from each other with a groove 130 defined therebetween. The surfaces of the exposed surfaces of the ribs 128 and groves 130 have diamond particles 132 adhered thereto. The diamond particles 132 are preferably on the order of 100 to 120 mesh in size. The circumferentially facing surfaces 134 on the projections 124 have diamond particles 132 adhered thereto in a region adjacent to the juncture of the surfaces 134 with the radially outwardly facing surfaces 136 bounding the ribs 128 and grooves 130. This region contacts the belt/belt sleeve 10 during the grinding operation.

A relief 138 is defined between adjacent projections 124. Through this arrangement, the stress on the surface of the belt/belt sleeve 10 during grinding is intermittently relieved to thereby restore the deformed belt/belt sleeve 10 to its undeformed state. As a result, the belt/belt sleeve 10 may be safely, consistently, and accurately ground through the projections 124 without producing any negative stress. The number of reliefs 138 is preferably relatively high, as appropriately determined by one skilled in this art.

Figure 8:
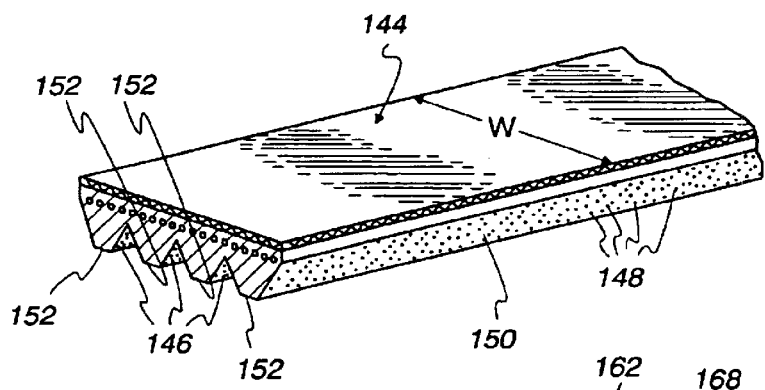
FIG. 8 is an enlarged, fragmentary, perspective view of a V-ribbed belt made according to the present invention.

In the event of the formation of a belt sleeve 10, the belt sleeve is cut to form individual V-ribbed belts, as show at 144 in FIG. 8. Each belt 144 has a predetermined width W. The belt 144 has a plurality of grooves 146 formed therein. Short fibers 148 are exposed at the side surfaces 150 of individual ribs 152 to contact a cooperating pulley (not shown).

Figure 9:
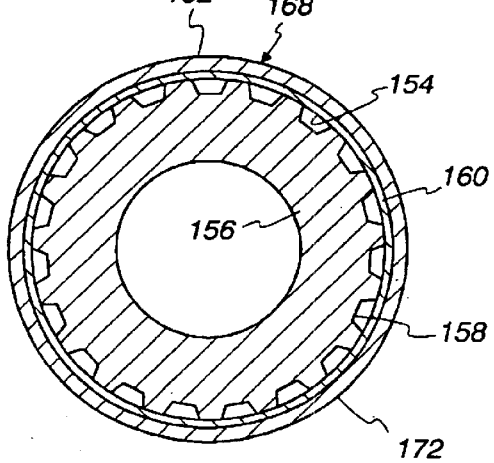
FIG. 9 is an elevation view of a cross-sectioned mold around which a belt/belt sleeve is wrapped to form alternating teeth and grooves in the belt/belt sleeve.
Figure 10:
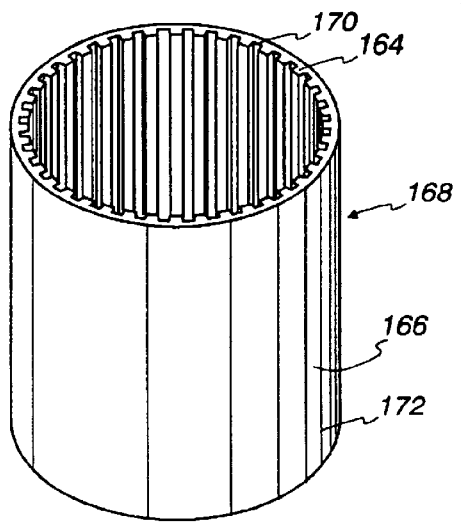
FIG. 10 is a reduced perspective view of the belt/belt sleeve with teeth and grooves formed using the mold in FIG. 9.

The invention also contemplates the treatment of toothed belts/belt sleeves. More particularly, as shown in FIGS. 9 and 10, a canvas cylinder 154 is wrapped around a mold/drum 156 having grooves 158 formed therein at regular intervals around the circumference of the mold/drum 156. Load carrying cords 160 are wrapped over the canvas cylinder 154 in a spiral pattern. An unvulcanized rubber layer 162 is applied over the load carrying cords 160 to define teeth 164 and the back surface 166 on the completed belt/belt sleeve 168. The teeth 164 are spaced at regular intervals, with there being grooves 170 between adjacent teeth 164.

The unvulcanized belt sleeve 168 is then covered with a vapor-impervious film 32 in the same manner as previously described. The mold/drum 156 with the belt/belt sleeve 168 mounted thereon and covered with the film 32 is placed in the vulcanizing vessel 50 and vulcanized.

The belt sleeve 168 can then be removed from the mold/drum 156 and operatively mounted on the grinding system 80 to polish and flatten the radially outwardly facing surface 172 which was covered by the film 32. The belt sleeve 168 can then be cut with a cutter in a conventional manner to form individual belts with a predetermined width.

The following describes a representative belt sleeve sample and process of belt sleeve formation, according to the invention.

Polyethylene terephthalate fiber of 1,100 denier was twisted with a final twist of 11.4 per 10 cm and a primary twist of 21.0 per 10 cm in opposite direction to produce load carrying cords twisted at a twist multiplier of 2×3. Each cord had a total denier of 6,600. Raw cord was pre-dipped in an isocyanate-type adhesive, then dried at approximately 170° C. to 180° C., and thereafter dipped in RFL, and finally fixed by heating at a temperature of 200° to 240° C., with the cord stretched, to obtain the processed cord.

Plain weave canvas made from cotton spun yarn was used as the reinforcing fabric. This fabric was dipped in RFL, and then heated at 150° C. for 2 minutes to obtain a processed canvas. The processed canvas was then coated with a rubber composition through friction coating to obtain rubber-impregnated canvas.

Chloroprene rubber with short aramid fibers therein was used to form the compression and tension rubber layers. The adhesive rubber layer was also made from chloroprene rubber without any reinforcing fibers.

The reinforcing fabric, the unvulcanized rubber sheet forming the tension rubber layer, the unvulcanized rubber sheet forming the cushion rubber layer, the load carrying cords, and the unvulcanized rubber sheet forming the compression rubber layer were wound sequentially around a mold having a smooth surface to produce a belt sleeve. Next, a synthetic resin film made of Saran Wrap® material, was spirally wound in a two-ply form around the outer surface of the unvulcanized belt sleeve and partially over both ends of the mold. The rubber impregnated canvas was applied onto the synthetic resin film at the upper and lower corners of the mold. The mold with the belt sleeve and film thereon was placed in a vulcanizing vessel, in which the vulcanization took place.

The mold was taken out of the vulcanizer and the synthetic resin film peeled from the belt sleeve. Through inspection, it was determined that the surface of the belt sleeve was somewhat rough since the belt sleeve was directly vulcanized, but had no synthetic significant porosity.

The belt thus obtained was set up in a system as in FIG. 6 under tension between a driving and drive roller thereon. A diamond covered driving wheel was rotated at 1800 rpm oppositely to the running direction of the belt sleeve to effect grinding thereof. A rotary brush having brass bristles was rotated at 450 rpm in a direction oppositely to the advancing direction of the belt sleeve while being pressed against the belt sleeve at a pressure of 2.0 kg/cm$^2$. A vacuum device was used to draw particulate from the belt sleeve, which vacuum was maintained at 25 m/sec.

The grinding simultaneously produced 80 grooves on the exposed belt sleeve surface. The depth of each groove was approximately 2 mm. The grinding occurred for 3.5 minutes.

The belt sleeve was then cut to form individual V-ribbed belts, each with a width of 3 ribs. It was found that the surface of the belts had no pores after vulcanization. The belts all had a good outward appearance with the short fibers embedded therein being exposed at their rib surfaces.

With the invention as thus described, the need for a custom formed jacket is obviated. A supply of one type of film can be kept on hand and can be used regardless of the belt/belt sleeve configuration. By reason of not having to stock multiple jacket sizes, space can be efficiently used. Also, the film is relatively inexpensive and can be easily compacted and disposed of after it is used. This obviates the need to regularly inspect the jackets and to dispose of and replace defective jackets over time. At the same time, the assembly lines need not be interrupted to search for an appropriate jacket. Instead, each belt/belt sleeve can be conveniently wrapped at the appropriate pre-vulcanized location. By a simple grinding operation, the appearance and texture of the exposed surface of the belt vulcanized through the film can be easily treated. All these results may be realized without sacrificing the quality of the vulcanization. That is, the film can positively prevent the formation of pores and bubble retention in the vulcanized rubber.

The inventive process can be used with all types of belts, i.e. V-ribbed belts, toothed belts, flat belts, etc. to produce a high quality belt with a good appearance.

The above advantages may be particularly advantageous for small production facilities and facilities where a relatively small quantity of a particular belt configuration is required.

The foregoing disclosure of specific embodiments is intended to be illustrative of the broad concepts comprehended by the invention.

What is claimed is:

1. A method of treating a power transmission belt/belt sleeve of the type having an endless body with a length extending around an axis and a radially inwardly facing surface and a radially outwardly facing surface, said method comprising the steps of:

wrapping at least one sheet of vapor-impervious film against and around the radially outwardly facing surface of the belt/belt sleeve body with the belt/belt sleeve on a support; and vulcanizing the belt/belt sleeve wit the at least one sheet of vapor-impervious film wrapped around the belt/belt sleeve body, wherein the belt/belt sleeve body has axially spaced, axially facing ends which join to the radially outwardly facing surface of the belt/belt sleeve body at first and second corners and further including the step of applying a sealing material in addition to the vapor-impervious film at at least one of the first and second corners prior to vulcanizing the belt/belt sleeve.

2. The method of treating a power transmission belt/belt sleeve according to claim 1 wherein the step of applying a sealing material comprises the step of applying a fibrous sealing material that comprises at least one of rubber-impregnated canvas and non-woven fabric.

3. A method of treating a power transmission belt/belt sleeve of the type having an endless body with a length extending around an axis and a radially inwardly facing surface and a radially outwardly facing surface, said method comprising the steps of:

wrapping at least one sheet of vapor-impervious film against and around the radially outwardly facing surface of the belt/belt sleeve body with the belt/belt sleeve on a support; and vulcanizing the belt/belt sleeve with the at least one sheet of vapor-impervious film wrapped around the belt/belt sleeve body, wherein the step of wrapping comprises the step of wrapping the at least one sheet of vapor-impervious film spirally around the radially outwardly facing surface of the belt/belt sleeve body.

4. A treating system comprising:

a support;

a belt/belt sleeve having an endless body on the support, the body having a length extending around an axis and a radially inwardly facing surface and a radially outwardly facing surface;

at least one sheet of vapor-impervious film against and extending around the radially outwardly facing surface of the belt/belt sleeve body; and a vulcanizing vessel in which the belt/belt sleeve with the at least one sheet of vapor-impervious film thereon resides and in which a vulcanization process can be carried out, wherein the belt/belt sleeve body has axially spaced, axially facing ends which join to the radially outwardly facing surface of the belt/belt sleeve body at first and second corners and the treating system further comprises a sealing material which is applied over the vapor-impervious film at at least one of the first and second corners.

5. The treating system according to claim 4 further comprising a mold on which the belt/belt sleeve body is mounted, wherein the sealing material bridges between the belt/belt sleeve and the mold at the at least one of the first and second corners.

6. The treating system according to claim 4 wherein the sealing material comprises at least one of rubber-impregnated canvas and non-woven fabric.

7. A treating system comprising:

a support;

a belt/belt sleeve having an endless body on the support, the body having a length extending around an axis and a radially inwardly facing surface and a radially outwardly facing surface;

at least one sheet of vapor-impervious film against and extending around the radially outwardly facing surface of the belt/belt sleeve body; and a vulcanizing vessel in which the belt/belt sleeve with the at least one sheet of vapor-impervious film thereon resides and in which a vulcanization process can be carried out, wherein the at least one sheet of vapor-impervious film is spirally wrapped around the radially outwardly facing surface of the belt/belt sleeve body.

8. A treating system comprising:

a support;

a belt/belt sleeve having an endless body on the support, the body having a length extending around an axis and a radially inwardly facing surface and a radially outwardly facing surface;

at least one sheet of vapor-impervious film against and extending around the radially outwardly facing surface of the belt/belt sleeve body; and a vulcanizing vessel in which the belt/belt sleeve with the at least one sheet of vapor-impervious film thereon resides and in which a vulcanization process can be carried out, wherein there are at least first and second layers of vapor-impervious film over the outwardly facing surface of the belt/belt sleeve body, the first layer having an edge between the axially spaced ends that over-/underlaps a part of at least one of the first and second layers.

* * * * *